(12) United States Patent
Lo

(10) Patent No.: US 6,520,192 B1
(45) Date of Patent: Feb. 18, 2003

(54) EXTENSIBLE POSITIONING DEVICE OF THE SHANK OF AN UMBRELLA

(76) Inventor: Albert Chong-Jen Lo, 3023, Windy Knoll Ct., Rockville, MD (US) 20850

( * ) Notice: Subject to any disclaimer, the term of this patent is extended or adjusted under 35 U.S.C. 154(b) by 0 days.

(21) Appl. No.: 09/987,287

(22) Filed: Nov. 14, 2001

(51) Int. Cl.$^7$ ............................. A45B 19/04; F16B 7/10
(52) U.S. Cl. ...................... 135/25.4; 135/114; 135/98; 403/109.3; 403/109.5; 248/188.5; 248/411
(58) Field of Search ........................... 135/75, 98, 25.4, 135/114, 120.3; 403/109.3, 109.4, 109.5, 109.1; 248/188.5, 188.8, 411, 412

(56) References Cited

U.S. PATENT DOCUMENTS

| | | | |
|---|---|---|---|
| 3,284,114 A | * 11/1966 | McCord, Jr. et al. | 403/370 |
| 3,380,097 A | * 4/1968 | Pharris | 15/145 |
| 3,722,903 A | * 3/1973 | Jones | 280/823 |
| 4,277,197 A | * 7/1981 | Bingham | 403/104 |
| 4,378,172 A | * 3/1983 | Groschupp | 403/104 |
| 4,596,405 A | * 6/1986 | Jones | 280/823 |
| 4,807,837 A | * 2/1989 | Gawlik et al. | 248/125.8 |
| 4,948,149 A | * 8/1990 | Lin et al. | 473/492 |
| 5,425,225 A | * 6/1995 | Franco | 56/332 |
| 5,433,551 A | * 7/1995 | Gordon | 403/377 |
| 5,649,780 A | * 7/1997 | Schall | 403/109.4 |
| 6,142,698 A | * 11/2000 | Nutter | 403/109.1 |

FOREIGN PATENT DOCUMENTS

| | | | | |
|---|---|---|---|---|
| EP | 336837 | * | 4/1989 | 403/109.3 |
| GB | 2063352 | * | 6/1981 | 403/109.3 |

* cited by examiner

*Primary Examiner*—Lanna Mai
*Assistant Examiner*—Winnie Yip
(74) *Attorney, Agent, or Firm*—Bacon & Thomas, PLLC

(57) ABSTRACT

An extensible positioning device of the shank of an umbrella includes an outer tube, an inner tube, an adjusting cylinder and a fixing cylinder. The inner tube may telescope in the outer tube. The outer tube has holes spaced apart horizontally in a lower portion for compressing members of positioning arms of the fixing cylinder to move in and out. The adjusting cylinder has female threads formed in a lower end, and the fixing cylinder has male threads engaging the female threads after the adjusting cylinder and the fixing cylinder fit around the outer tube. When the adjusting cylinder is screwed tightly around the fixing cylinder, the compressing members of the fixing cylinder moves gradually in the holes of the outer tube and further compress the inner tube tightly to keep the inner tube at an adjusted position relative to the outer tube.

1 Claim, 6 Drawing Sheets

EXTENSIBLE POSITIONING DEVICE OF THE SHANK OF AN UMBRELLA

BACKGROUND OF THE INVENTION

This invention relates to an extensible positioning device of the shank of an umbrella, particularly to one firmly keeping the shank at one of many adjustable positions without fail.

A conventional adjustable shank of an umbrella shown in FIG. 1 includes an inner tube 10 and an outer tube 20 for the inner tube to telescope therein, and an eccentric fixing grip 201 located at a proper point of the outer tube 20 for compressing the inner tube 10 to keep the inner tube 10 immovable to the outer tube 20. If the fixing grip 201 is released, the inner tube 10 can freely telescope in the outer tube 20 so as to adjust the whole length of the shank.

However, the fixing grip 201 in the conventional adjustable shank forces inward the inner tube 10 only at one point, so its compressing force may often not be enough to stop the inner tube 10 from moving after fixed, causing the inner tube move down gradually to shorten the shank.

SUMMARY OF THE INVENTION

The objective of the invention is to offer an extensible positioning device of the shank of an umbrella capable to keep an inner tube at an adjusted position relative to an outer tube firmly without possibility of the outer tube moving down to shorten the shank as the conventional one does.

The feature of the invention is an outer tube, an inner tube telescoping in the outer tube, and an adjusting cylinder and a fixing cylinder fitting around the outer tube and screwing with each other so that the adjusting cylinder may screw tightly inward the fixing cylinder so that compressing members of positioning arms of the fixing cylinder may move in holes in the outer tube and then further compress the inner tube tightly to keep the inner tube at an adjusted position relative to the outer tube.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
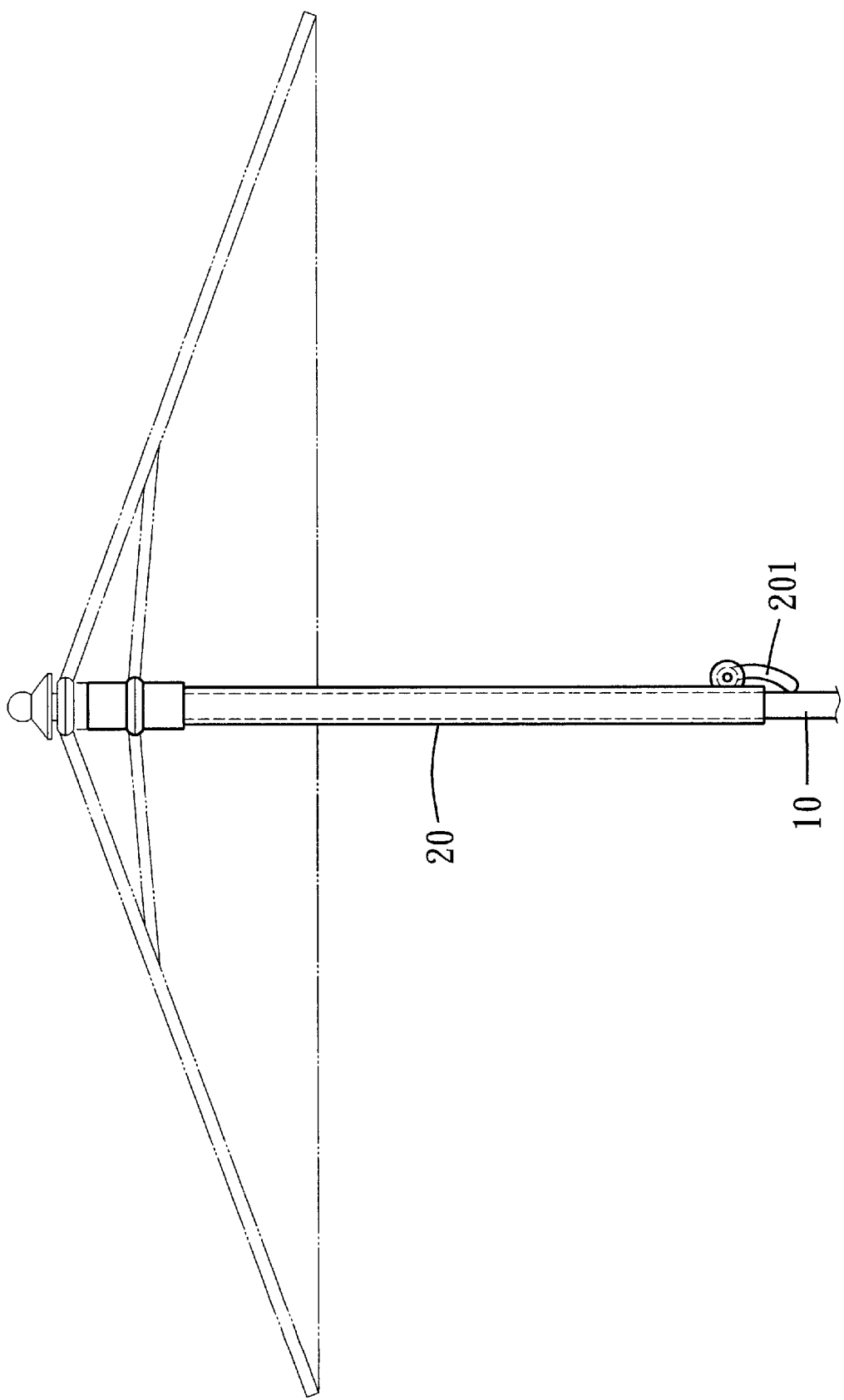
FIG. 1 is a side view of a conventional umbrella.
Figure 2:
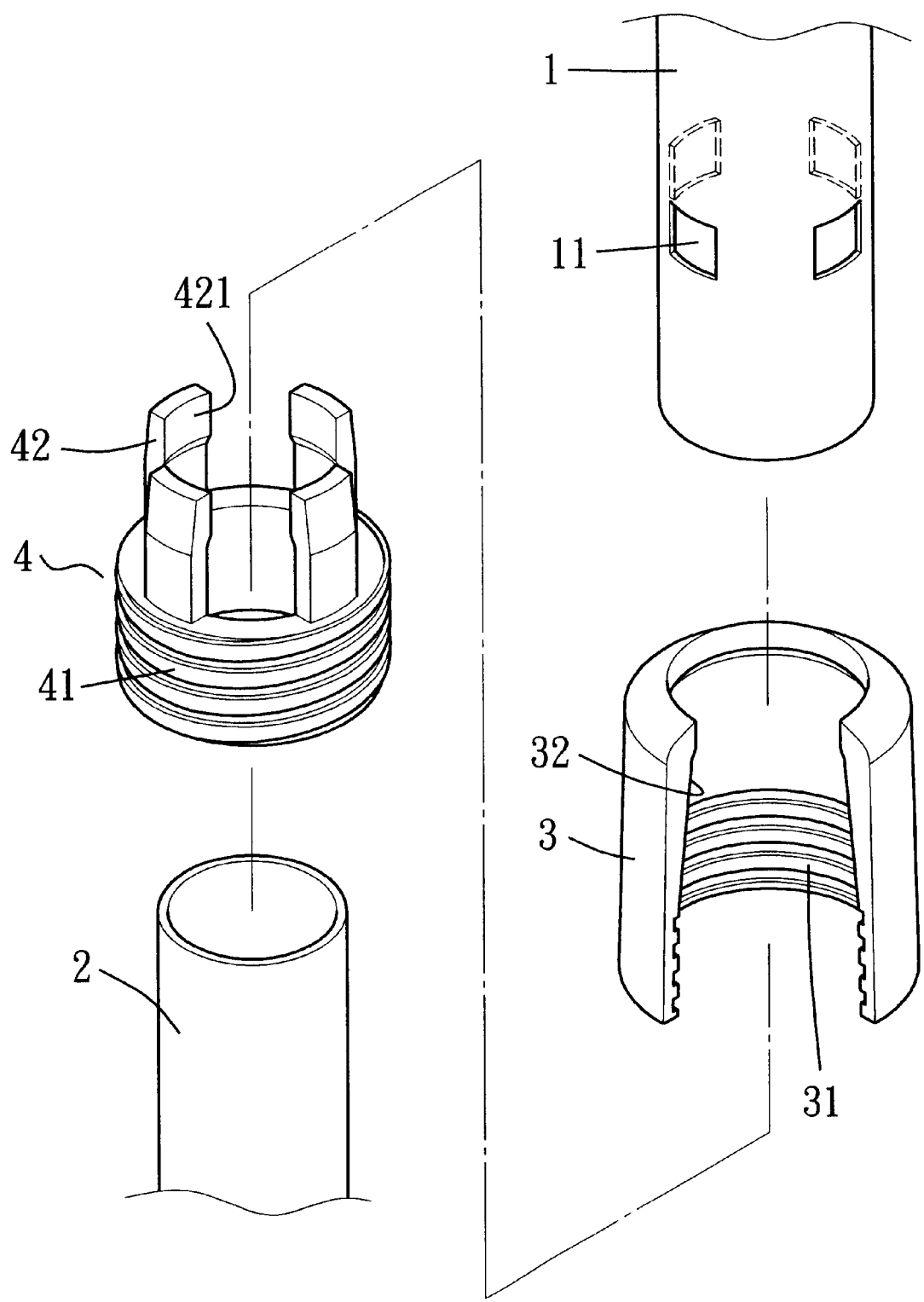
FIG. 2 is an exploded perspective view of an extensible positioning device of the shank of an umbrella in the present invention.

A preferred embodiment of an extensible positioning device of the shank of an umbrella in the present invention, as shown in FIG. 2, includes an outer tube 1, and an inner tube 2 telescoping in the outer tube 1, an adjusting cylinder 3 and a fixing cylinder as main components combined together.

The outer tube 1 has a plurality of holes 11 spaced apart horizontally and equidistantly in a lower end portion, and four holes used in the embodiment for example.

The inner tube 2 inserts in the outer tube 1 and freely telescopes therein so as to be kept at any of many positions relative to the outer tube 1 by the adjusting cylinder 3 and the fixing cylinder 4.

The adjusting cylinder 3 fits around the outer tube 1, and moving up and down by rotating, having female threads 31 formed in an inner lower portion and an inner diameter gradually belittling upward to form a cone-shaped compressing surface 32.

The fixing cylinder 4 fits around the outer tube 1, having male threads 41 formed in a lower outer surface, and a plurality of positioning arms 42 (also four arms to corresponding to the four holes 11 in the embodiment) spaced apart equidistantly and standing upward from the make threads 41, and positioning arms 42 have their outer surfaces also sloping as the compressing surface 32 of the adjusting cylinder 3. Further, each positioning arm 42 has a compressing member 421 formed in an upper portion capable to be moved in or out of the holes 11 of the outer tube 1.

Figure 3:
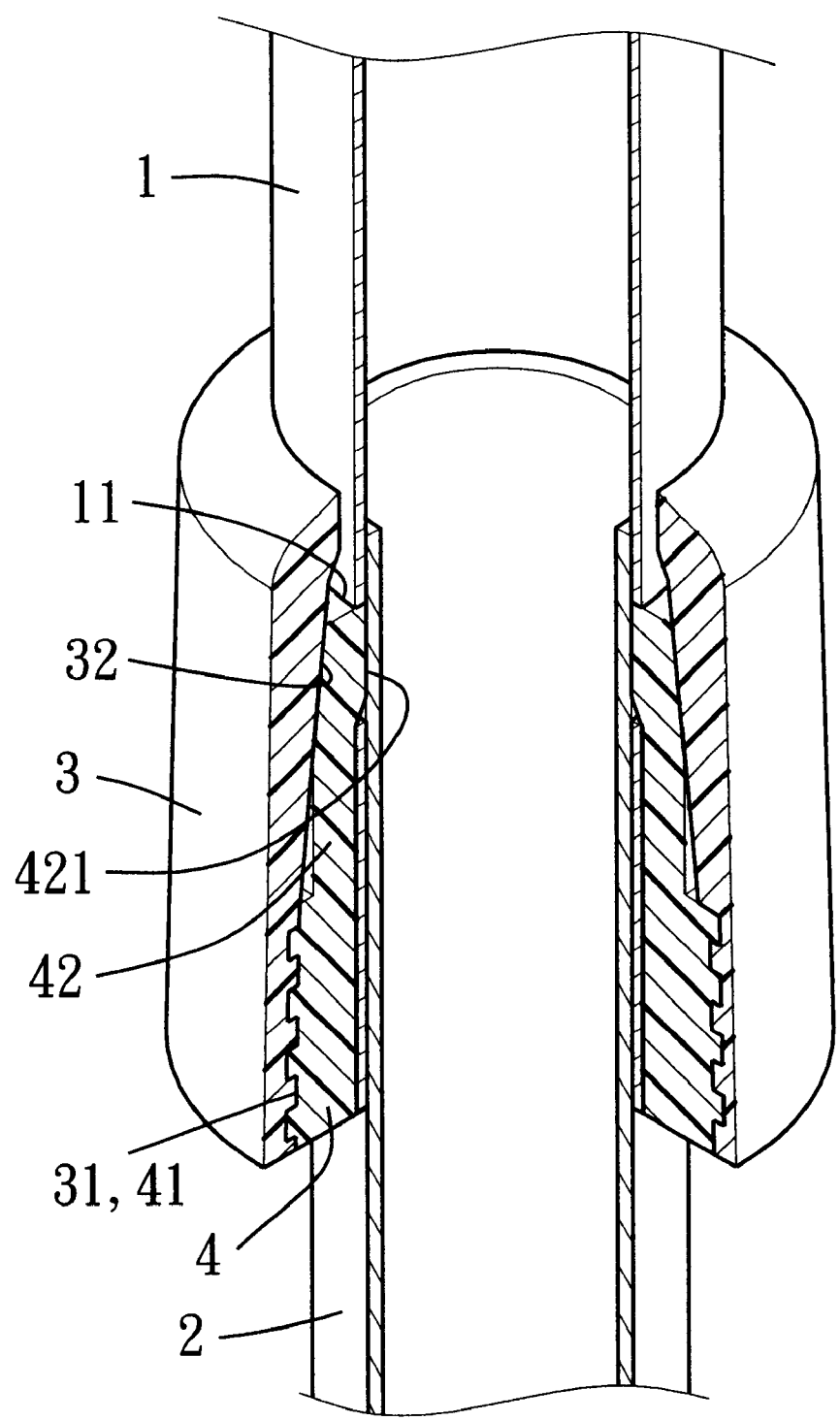
FIG. 3 is a cross-sectional view of the extensible positioning device for the shank of an umbrella in the present invention.

FIG. 3 shows the extensible positioning device combined together, with the adjusting cylinder 3 and the fixing cylinder 4 respectively fitted around the outer tube 1, with the compressing member 421 of the positioning arms 42 of the fixing cylinder 4 fitted in the relative holes 11 of the outer tube 1. Then the adjusting cylinder 3 screws around the fixing cylinder 4.

Figure 4:
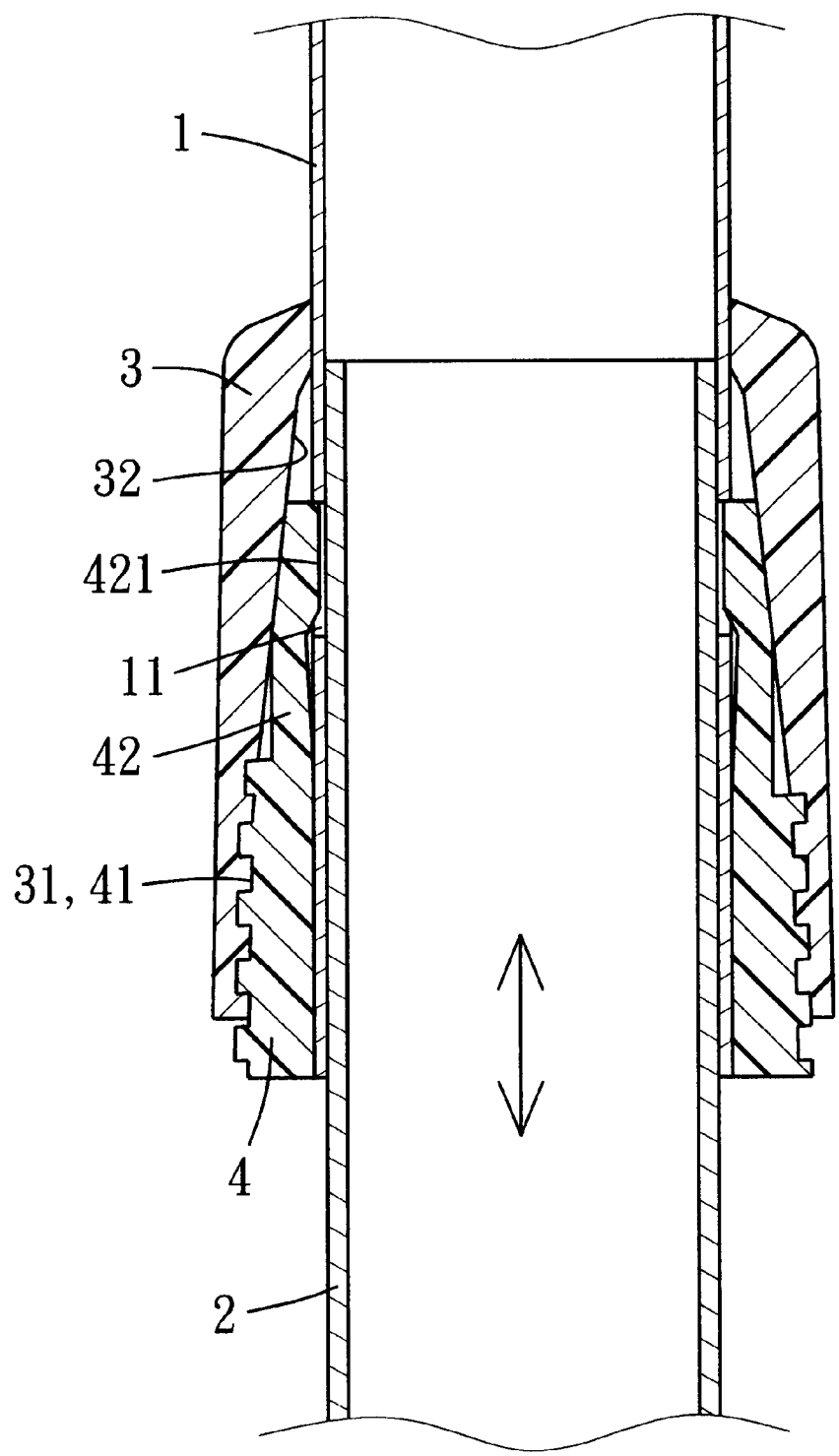
FIG. 4 is a cross-sectional view of the extensible positioning device for the shank of an umbrella in the present invention, showing it loosened to let an inner tube movable to an outer tube.
Figure 5:
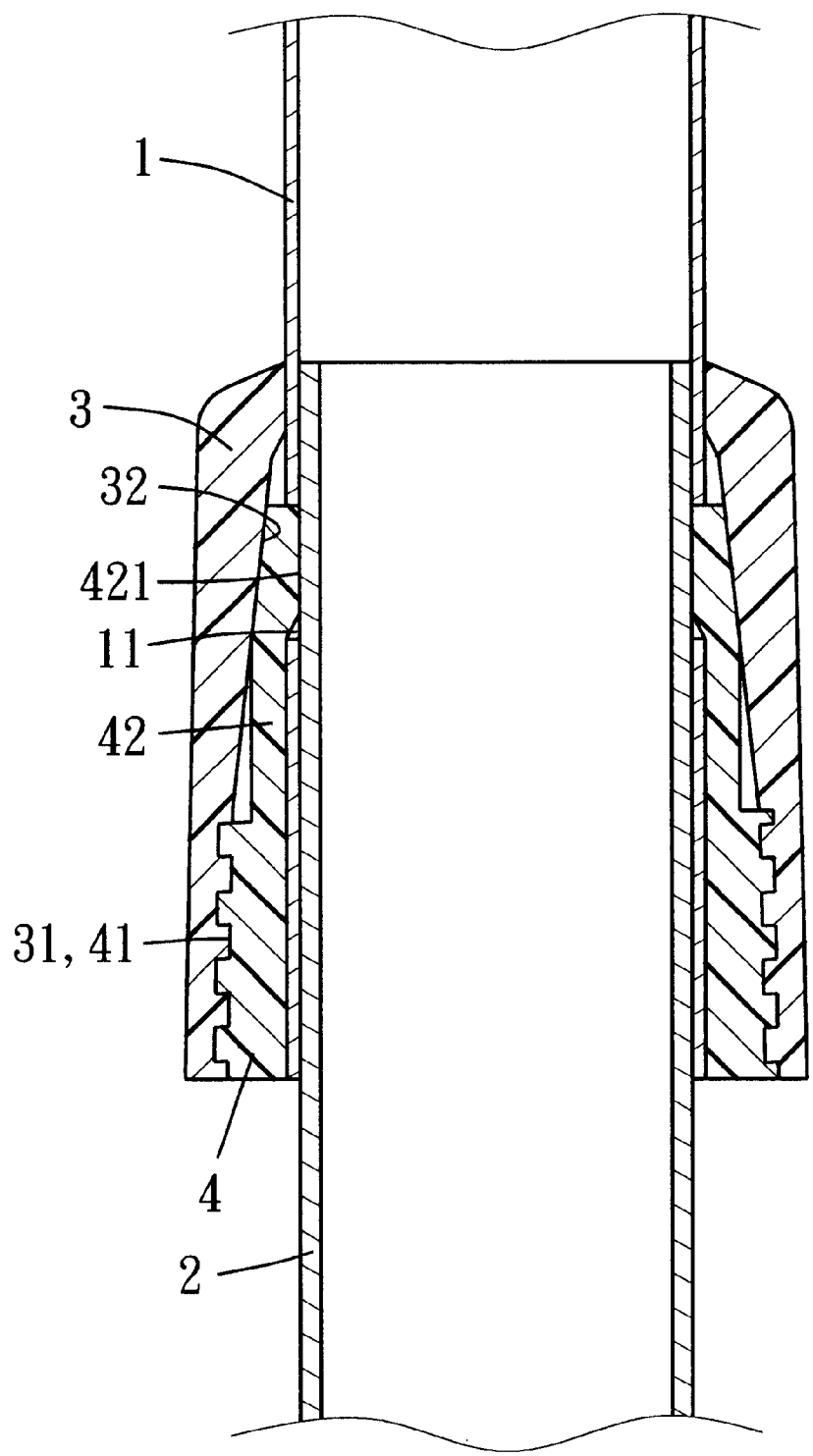
FIG. 5 is a cross-sectional view of the extensible positioning device for the shank of an umbrella in the present invention, showing it tightened to keep the inner tube immovable at an adjusted position to an outer tube.

In using the extensible positioning device of the shank of an umbrella, referring to FIG. 4, screw loosely the adjusting cylinder 3, letting the compressing surface 32 of the adjusting cylinder 3 loosen the positioning arms 42 of the fixing cylinder 4, and the compressing members 421 only fitting in the holes 11 but not compressing the inner tube 2. Then the inner tube 2 is free to telescope in the outer tube 1 to adjust its position relative to the outer tube 1 so that the whole length of the shank may be adjusted to a needed one. Then the adjusting cylinder 3 is needed to screw down tightly against the fixing cylinder 4, as shown in FIG. 5, forcing the compressing surface 32 gradually moving inward to push the compressing members 421 inward the holes 11 of the outer tube 1 to compress inward the inner tube 2 in a plurality of directions (in the embodiment four directions). Thus, the inner tube may be kept firmly at the adjusted position, keeping the shank in the adjusted length without fail.

Figure 6:
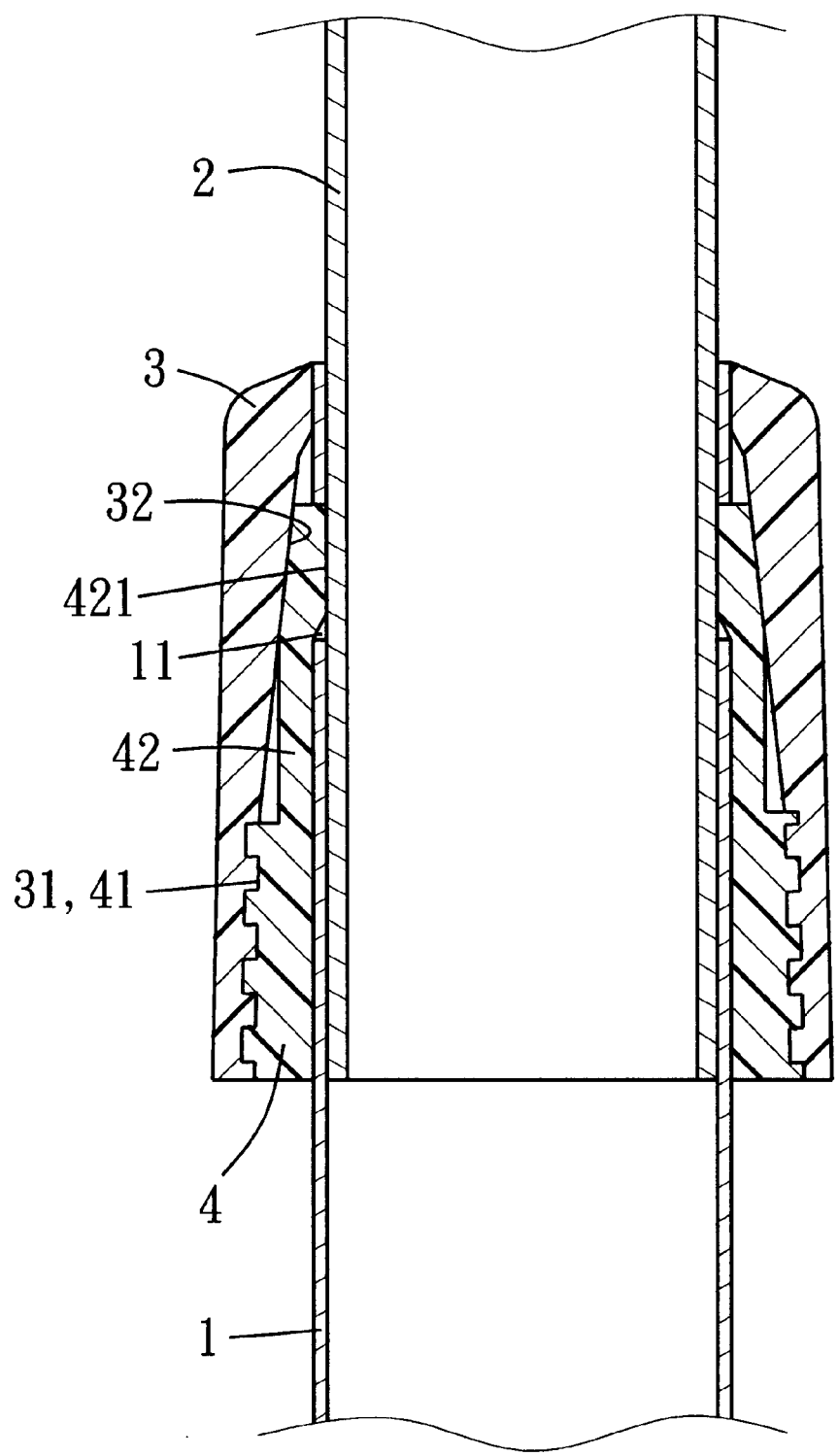
FIG. 6 is a cross-sectional view of the extensible positioning device for the shank of an umbrella in the present invention, showing it used in another way.

Next, FIG. 6 shows the outer tube 1 is located below the inner tube 2 to constitute the shank of an umbrella, contrary to the embodiment described above. In this case, The holes 11, the adjusting cylinder 3 and the fixing cylinder 4 are provided to locate around an upper portion of the outer tube 1, and this structure also has the same function of adjusting and positioning the length of the shank as the above embodiment.

While the preferred embodiment of the invention has been described above, it will be recognized and understood that various modifications may be made therein and the appended claimed are intended to cover all such modifications that may fall within the spirit and scope of the invention.

I claim:

1. A extensible positioning device of the shank of an umbrella comprising an outer tube, an inner tube telescoping in said outer tube, an adjusting cylinder and a fixing cylinder, said outer tube having a plurality of holes spaced apart horizontally in a lower portion where said inner tube fits in, said adjusting cylinder fitted around said outer tube and having female threads in a lower end and a cone-shaped compressing surface formed in an inner wall of an upper end, said fixing cylinder fitted around said outer tube and having male threads engaging said female threads of said adjusting cylinder, said fixing cylinder having a plurality of spaced-apart positioning arms standing on said male threads portion in a circle, each said positioning arm having a compressing member formed in an upper portion capable to move in and out of said holes in said outer tube, said adjusting cylinder screwing with said fixing cylinder with said compressing surface pressing inward said positioning arms and said compressing members to move in said holes and compress said inner tube to keep said inner tube immovable at an adjusted position relative to said outer tube when the adjusting tube is screwed down gradually and tightly around said fixing cylinder.

* * * * *